United States Patent [19]

Thornsberry

[11] Patent Number: 4,751,251
[45] Date of Patent: Jun. 14, 1988

[54] SURFACTANT COMPOSITION FOR RIGID URETHANE AND ISOCYANURATE FOAMS

[75] Inventor: James D. Thornsberry, Midland, Mich.

[73] Assignee: Dow Corning Corporation, Midland, Mich.

[21] Appl. No.: 51,907

[22] Filed: May 19, 1987

[51] Int. Cl.$^4$ .............................................. C08G 18/14
[52] U.S. Cl. .................................. 521/112; 252/182.14
[58] Field of Search .......................... 521/112; 252/182

[56] References Cited

U.S. PATENT DOCUMENTS

| | | | |
|---|---|---|---|
| 3,562,786 | 2/1971 | Bailey et al. | 252/137 |
| 3,594,334 | 7/1971 | Marlin | 260/2.5 |
| 3,790,612 | 2/1974 | Raleigh | 260/443.2 |
| 3,933,695 | 1/1976 | Omietanski et al. | 252/352 |
| 4,081,410 | 3/1978 | Moeller | 260/2.5 |
| 4,572,919 | 2/1986 | Londrigan | 521/115 |

OTHER PUBLICATIONS

Skowronski, M. J. and Londrigan, M. E., "Organic Surfactants for Rigid Urethane and Isocyanurate Foam", 1977.

Primary Examiner—Maurice J. Welsh
Attorney, Agent, or Firm—Price, Heneveld, Cooper, DeWitt & Litton

[57] ABSTRACT

The specification discloses a surfactant composition for rigid urethane, including isocyanurate foams which includes from about 15 to about 50% each of the following ingredients: (1) an organic surfactant; (2) a siloxane-polyoxyalkylene surfactant; and (3) one of water, C-1 to C-3 alcohol and mixtures thereof.

32 Claims, No Drawings

SURFACTANT COMPOSITION FOR RIGID URETHANE AND ISOCYANURATE FOAMS

BACKGROUND OF THE INVENTION

The present invention relates to rigid polyurethane foams and to surfactants used in such foams. The term polyurethane as used herein is intended to include so-called isocyanurate foams, which include a greater proportion of isocyanate than normal polyurethanes, allowing trimer formation. Both polyester and polyether urethanes are also encompassed by the term.

Surfactants are used in rigid polyurethane foam formulations to facilitate foam formation. Silicone surfactants, siloxane-polyoxyalkylene block copolymers, are almost exclusively used as surfactants for rigid polyurethane foam systems. The general formula for such copolymers is as follows:

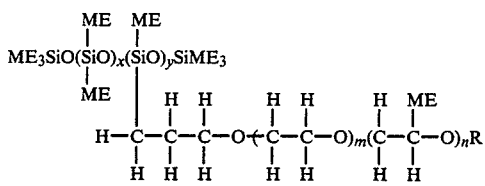

where
ME is $CH_3$ and
R is a terminal group compatible with surfactant activity. Example R groups include acetoxy group (OAc), a hydroxyl group (OH), a methoxy group (OME), dodecyl succinic anhydride (DDSA), carboxy functional groups and amino functional groups.

Not all siloxane-polyoxyalkylene copolymers work satisfactorily as surfactants for rigid polyurethane foams. For rigid polyurethane foams it is generally preferred that siloxane-polyoxyalkylene copolymers have the following parameters:

$x = 7$ to $10$
$y = 2$ to $5$
$m = 5$ to $15$
$n = 0$ to $5$

For rigid polyurethanes, the silicone backbone must usually have a molecular weight of from about 1000 to 7000. For flexible urethanes, the silicone backbone molecular weight runs from about 7000 to 12000. For the high resiliency urethanes, the lower silicone backbone molecular weights are preferred, i.e., 220 to 1000.

Many organic surfactants are substantially less expensive than silicone surfactants. Recently, some specific types of organic surfactants have been used as the exclusive surfactant in rigid polyurethane formulations. However, most common organic surfactants are rarely used in rigid polyurethane foams. Among various problems encountered, organic surfactants generally substantially degrade the insulating capability of the rigid polyurethane foam. Typical K factors for rigid polyurethanes incorporating organic surfactants exceed 0.125, as exemplified in the following examples:

| Organic Surfactant Incorporated Into A Rigid Polyurethane Foam System | K Factor |
|---|---|
| Triethanolamine salt of a linear alkyl benzene sulfonic acid | .149 |
| Alkyl ($C_{12}$-$C_{14}$-$C_{16}$) dimethyl amine oxide | .144 |
| Cocoamidopropyl betaine | .143 |
| Sodium octyl sulfate | .144 |
| Triethanolamine N—lauryl sarcosinate | .147 |
| Tridecyl alcohol poly ethoxy sulfate | .142 |
| Sodium dioctyl sulfosuccinate | .132 |
| Linear primary alcohol ethoxylate | .137 |
| Sodium $C_{14}$-$C_{16}$ olefin sulfonate | .147 |
| Sodium dodecyl benzene sulfonate | .168 |

These compare with typical K factors of 0.115 for rigid polyurethanes incorporating silicone surfactants.

Both organic surfactants and silicone surfactants are used in formulating flexible polyurethane foams. Union Carbide U.S. Pat. No. 3,594,334 to Marlin discloses incorporating combinations of anionic organic surfactants and siloxane-polyoxyalkylene surfactants (of 600 to 17,000 molecular weight containing 14 to 40% siloxane and containing 75% oxyethylene in the oxyalkylene component) as surfactants in flexible polyurethane formulations. Such surfactant combinations would not be expected to operate satisfactorily in typical rigid urethane formulations because of the adverse impact of the organic surfactant on the K factor, as well as other factors. My experimental work supports this expectation.

SUMMARY OF THE INVENTION

I have surprisingly found, however, that by incorporating a minor amount of water (and/or comparably isocyanate active alcohol), which is only occasionally used in rigid polyurethane foam formulations, into a rigid polyurethane polymer formulation along with a combination of an organic surfactant and a siloxane-polyoxyalkylene surfactant, I obtain surprisingly superior rigid urethane foam products in almost all combinations. The term rigid polyurethane polymer formulation or system as used herein refers to the polyether or polyester component, the isocyanate component, the blowing agent, the surfactant and other additives. The term is intended to include the isocyanurates. The water and/or alcohol surfactants can be premixed and introduced into the polymer system, they can be added separately or the water and/or alcohol can be incorporated into the polyether or polyester component in advance, but obviously not in the isocyanate component.

As a result of this combination, rigid polyurethane polymers are formed having increased foam height, improved system flow, lower density and surprisingly, K factors which are at least as good as the K factors observed when siloxane-polyoxyalkylene surfactants are used alone. Further, the range of siloxane-polyoxyalkylene surfactants which can be used in rigid polyurethane foam formulations is substantially increased by incorporating water and an organic surfactant into the polymer system. The system performs well even using siloxane-polyoxyalkylene surfactants not normally operative in rigid polyurethane foam systems. Yet, the surfactant system as a whole can be produced for less than pure silicone surfactants.

These and other objects, advantages and features of the present invention will be more fully understood and appreciated by reference to the description of the preferred embodiment and claims.

DESCRIPTION OF THE PREFERRED EMBODIMENT

In the preferred embodiment, minor amounts of (1) water and/or C-1 to C-3 alcohols, (2) an organic surfactant and (3) a siloxane-polyoxyalkylene block copolymer are incorporated into a rigid polyurethane foam system. The total of the three ingredients is between about 1% and about 2% by weight of the total polyurethane formulation. The proportions of the three critical ingredients relative to one another is such that each of the three ingredients comprises from about 15 to about 50% by weight of the three.

The rigid urethane polymer system also comprises a polyether or polyester polyol component, a blowing agent, an isocyanate component and other typical additives. If the organic surfactant and the siloxane-polyoxyalkylene copolymer are selected so as to be cosoluble with each other and the water and/or alcohol, the three ingredients can be premixed as a surfactant composition for later addition to the rigid polyurethane foam system. Alternatively, the water and/or alcohol could be premixed into the polyether or polyester polyol component of the system, though obviously not in the isocyanate component. An appropriately selected siloxane-polyoxyalkylene copolymer, i.e., one having a nonisocyanate reactive terminal group, and/or a properly selected organic surfactant, as for example a nonionic surfactant free of water, could be incorporated in the isocyanate component of the system.

A wide range of siloxane-polyoxyalkylene block copolymers are operable in the practice of the present invention. Thus, acceptable formulas fall within the following range:

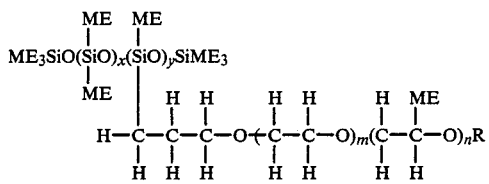

where: $x=1-160$, $y=1-15$, $m=0-20$, $n=0-20$, $m+n=$ at least 1, if $n=5-20$, then $m=5-20$, and $R=$ any terminal group which is compatible with surfactant activity.

This encompasses a far broader range of siloxane-polyoxyalkylene copolymers than is typically thought of for use in rigid polyurethane formulations.

Of the siloxane-polyoxyalkylene copolymers falling within the foregoing ranges, much of the experimental work reported herein was conducted with the following siloxane-polyoxyalkylene copolymers:

| Copolymer Identification | x | y | m | n | R |
|---|---|---|---|---|---|
| Copolymer I | 103 | 9.5 | 18 | 18 | OAc |
| Copolymer II | 8.6 | 3.6 | 12 | 0 | OH |
| Copolymer III | 8.6 | 3.6 | 12 | 0 | OAc |
| Copolymer IV | 8.6 | 3.6 | 7 | 0 | OH |
| Copolymer V | 1 | 1 | 0 | 2 | OME |

Of the foregoing, Copolymer IV appears to be the most preferred siloxane-polyoxyalkylene copolymer for use in the best mode for practicing the invention.

A wide variety of organic surfactants are operable in the present invention. Nonionic, cationic and anionic types of surfactants have been successfully employed. Some surfactants are sold commercially in aqueous diluted form. Some are diluted with water and a 1-3 carbon alcohol and one is diluted with ethanol alone. Where alcohol and water are used, the alcohol is usually about one-third of the water by weight. Such commercial products, where the water content is high enough, serve as the source of water as well as the source of organic surfactant.

The following is a list of successfully employed organic surfactants (coded for easy reference below), generally categorized by family, with the trade name and percent actives, if diluted (the diluent being water unless otherwise specified), indicated in parentheses:

| Family Description | Surfactants |
|---|---|
| ETHER SULFATES | S1. Sodium salt of sulfated ethoxylate of a primary linear alcohol (Cedepal FS-406 58% ± 1% in 24-26.5% water and 13.5% ± 1.0% ethanol) |
| | S2. Tridecyl polyoxyethylene (3) sodium sulfate (Cedepal TD-403 30% ± 1.0% in 68-70% water) |
| | S3. Sodium salt of a lauryl ether sulfate (Polystep B-12 58.5-60.5% in 25-27% water and 13-15% ethanol) |
| | S4. Sodium lauryl ether sulfate (Cycloryl NA-2 28%) |
| | S5. Sodium lauryl ether sulfate (Cycloryl NA-61CG 58% in 26% water and 14% ethanol) |
| | S6. Sodium salt of lauryl ether sulfate (Polystep B-19 26-27%) |
| FATTY ALCOHOL SULFATES | S7. Diethanolamine lauryl sulfate (Cycloryl DA 33.5-35.5%) |
| | S8. Tridecyl polyoxyethylene (3.0) sodium sulfate (Cedepal TD-407F 74% in water and isopropanol) |
| | S9. Sodium laureth-12-sulfate (Standapol 125E 58%) |
| | S10. Ammonium lauryl sulfate (Stepanol AM 28-30%) |
| | S11. Mealauryl sulfate (Cycloryl SA 38%) |
| | S12. Ammonium lauryl sulfate (Sipon L-22 28%) |
| | S13. Ammonium lauryl sulfate (Standapol A 28%) |
| | S14. Sodium lauryl sulfate (Stepanol-wa-extra 28-30%) |
| | S15. Ammonium lauryl sulfate (Cycloryl MA 28%) |
| | S16. Triethanolamine lauryl sulfate (Cycloryl WAT 40%) |
| | S17. Triethanolamine lauryl sulfate (Conoco sulfate TL 38.5-42.5%) |
| | S18. Sodium lauryl sulfate (Cycloryl 21LS 28%) |
| | S19. Sodium decyl sulfate (Polystep B-25 37-39%) |
| | S20. Magnesium lauryl sulfate (Cycloryl Mg 27%) |
| | S21. Sodium octyl sulfate (Polystep B-29 33%) |
| | S22. Sodium alcohol ethoxy sulfates (Steol CS-460 59%) |
| | S23. Diethanolamine lauryl sulfate (Standapol DEA 37%) |
| SARCOSINATES | S24. Triethanolamine N—lauryl sarcosinate (Cycloryl Teals 40%) |
| AMINE OXIDES | S25. Decyl dimethylamine oxide (Barlox 10S 30%) |
| | S26. Lauramine oxide (Ninox L 30%) |
| | S27. Alkyl ($C_{12}$-$C_{14}$-$C_{16}$) dimethylamine |

| Family Description | Surfactants |
|---|---|
| | oxide<br>(Barlox 12 30%)<br>S28. Cocoamido-propylamine oxide<br>(Ninox CA 30%)<br>S29. Myristamine oxide<br>(Ninox M 30%)<br>S30. Alkyldimethyl amine oxide<br>(Barlox 14 30%) |
| SULFONATES | S31. Calcium alkyl benzene sulfonate<br>(Ninate 401 64.5–65.5% in n-hexanol and<br>a very minor amount - 2–3% - methanol)<br>S32. Amine dodecyl benzene sulfonate<br>(Polystep A-11 88%)<br>S33. Alkyl amine dodecyl benzene<br>sulfonate<br>(Ninate 411 95.0%)<br>S34. Triethanolamine dodecyl benzene<br>sulfonate<br>(Biosoft N-300 59.0–61.0%)<br>S35. Triethanolamine dodecyl benzene<br>sulfonate<br>(Stepantan DT-60)<br>S36. Sodium $C_{14}$–$C_{16}$ olefin sulfonate<br>(Bioterge AS-40 38.0–40.0%)<br>S37. Linear dodecyl benzene sulfonate<br>sodium salt<br>(Conoco AAS-40S 39%)<br>S38. Alpha olefin sulfonate<br>(Conoco AOS-40 38.5–40.5%)<br>S39. Sodium salt of an alpha olefin<br>sulfonate<br>(Polystep A-18 39%)<br>S40. Sodium dodecyl benzene sulfonate<br>(Biosoft D-35X 35%)<br>S41. Sodium $C_{14}$–$C_{16}$ olefin sulfonate<br>(Cycloryl AOS-40 36–40%)<br>S42. Sodium dodecyl benzene sulfonate<br>(Stepantan DS-40 60%)<br>S43. Sodium xylene sulfonate<br>(Conoco SXS 40%)<br>S44. Alkyl aryl sulfonate<br>(Atlox 3404F 100%) |
| BETAINES | S45. Cetyl dimethyl betaine<br>(Lonzaine 16-S 30% in ethanol)<br>S46. Coco dimethyl betaine<br>(Lonzaine 12-C 30%)<br>S47. Cocoamidopropyl betaine<br>(Cycloteric Bet C-30 30%) |
| AMIDES | S48. Lauramide diethanolamide<br>(Standamid LDS)<br>S49. Cocoamide diethanoloamide<br>(Standamid SD)<br>S50. Polyoxyethylene-6-cocoamide<br>(Unamide C-5 100%)<br>S51. Capramide DEA<br>(Standamide CD)<br>S52. Cocoamide diethanol amine<br>(Ninol 49-CE)<br>S53. Coconut fatty acid diethanol amide<br>(Cedemide DX 99%)<br>S54. Cocoamide diethanolamide<br>(Standamid KD)<br>S55. Diethanolamide lauramide<br>(Ninol 55-LL)<br>S56. Cocodiethanolamide<br>(Carsamide CA 100%)<br>S57. Coconut fatty acid diethanol<br>amide<br>(Cedemide CX 99%)<br>S58. Polyethylene glycol-6-cocoamide<br>(Amidox C-5 99%) |
| SULFO-<br>SUCCINATES | S59. Sodium dioctyl sulfosuccinate<br>(Aerosol GPG 100%)<br>S60. Sulfosuccinate salt<br>(Aerosol TR-70 100%) |
| SULFONIC<br>ACIDS | S61. Triethanolamine salt of linear<br>alkyl benzene sulfonic acid<br>(Cedepon T-60 60%) |
| ALKANOL-<br>AMIDES | S62. Coconut oil alkanolamide<br>(Ninol 40-CO)<br>S63. Alkanolamide |

| Family Description | Surfactants |
|---|---|
| | (Ninol 1285)<br>S64. Coconut oil alkanolamide<br>(Ninol 52-LL) |
| ETHOXYLATED<br>FATTY<br>ALCOHOL | S65. Ethoxylated linear primary alcohol<br>(Cedepal ET-460 99%)<br>S66. Linear primary alcohol ethoxylate<br>(Cedepal E-300 99%) |
| NONIONICS | S67. Polyoxyethylene sorbitol fatty<br>acid ester<br>(Atlox 1087 100%)<br>S68. Sorbitan monooleate<br>(Lonzest SMO 100%)<br>S69. Sorbitan monolaurate<br>(Arlacel 20 98%)<br>S70. Polyoxyethylene(2)oleyl ether<br>(Brij 92 100%)<br>S71. Polyalkoxylated sorbitol<br>(Atlas G-2455 99%)<br>S72. Polyoxyethylene(5)sorbitan<br>monooleate<br>(Tween 81 100%)<br>S73. Polyoxypropylene(15)stearyl<br>alcohol<br>(Arlamol E 99%)<br>S74. Sorbitan trioleate<br>(Lonzest STO 100%)<br>S75. Sorbitan monolaurate<br>(Lonzest SML 99%)<br>S76. Mono & diglycerides in propylene<br>glycol<br>(Arlacel 186 99%)<br>S77. Polyoxyethylene sorbitol fatty<br>acid ester<br>(Atlux 1087 100%) |
| MISCELLAN-<br>EOUS | S78. 1-4 butene diol (25%)<br>S79. 1-4 dihydroxy-2-butene (25%)<br>S80. Ammonium salt of sulfated nonyl<br>phenoxy poly (ethylene oxy) ethanol<br>(Alipal HF433 28% in water and<br>ethanol) |

Of the foregoing, sodium dodecylbenzene sulfonate appears to be the most preferred organic surfactant for use in the best mode of the present invention. This is sold commercially as a 35% active product and hence in its commercial form also serves as a source of water for use in the present invention.

Water is only occasionally used in rigid polyurethane foam systems. It lowers the thermal insulating efficiency of the rigid polyurethane foam. Yet its presence in the three component combination incorporated in the present invention does not adversely impact thermal insulating ability to any degree. The same can be said for the C-1 to C-3 alcohols which, because their reactivity with isocyanates is comparable to that of water, can be used in place of or in combination with water in this invention in any combination. Water is preferred, and in fact appears to be about 30 to 40% more active in the intended function than the alcohols.

The best mode combination of surfactants and water currently contemplated appears to comprise 25% by weight Copolymer IV silicone surfactant as described above and 75% by weight 40% active sodium dodecylbenzene sulfonate (S42). Thus, the surfactant combination comprises about 25% silicone surfactant, about 30% organic surfactant and about 45% water. It is most preferably used at a level of approximately 1.5% in the urethane foam formulation.

In preparing urethane foams, the major reactive ingredients, the isocyanate and the polyol, must possess an average functionality greater than two if a satisfactory cross-linked structure is to be obtained. In the simplest procedure for rigid foams a blend of polyols, blowing agent, surfactant and catalyst are mixed with a di- or tri-functional polyisocyanate, and simultaneous reaction and foam expansion occur.

The major difference between a flexible and rigid foam is found in the structure of the polyol. Flexible polyols are either di- or tri-functional; they are composed almost entirely of long, repeating units of alkylene oxide and are terminated with mainly secondary and some primary hydroxyl groups. Typically they are composed of over 95% propylene and ethylene oxide, and their hydroxyl numbers, an inverse measure of the equivalent weight, are in the neighborhood of 50.

Polyols for rigid foams are usually derived from a higher functionality "starter", either a polyol or polyamine to which only a few (1 to 3) units of propylene oxide are added for each active hydrogen. Additional functionality and cross-linking can be brought about by the use of polyisocyanates. Hydroxyl numbers of the major polyols for rigid foams are in the 250 to 700 range.

Rigid polyurethane foams use low equivalent weight, relatively high functionality polyols and relatively high functionality isocyanates. They have a high density of bulky, rigid isocyanate molecules and a high density of hydrogen bonds between urethane N—H and hydrogen bond acceptors.

Two types of aromatic isocyanates are used in rigid urethane foams. These include toluene diisocyanate which is sold in an 80:20 mixture of the 2,4- and 2,6-isomers. The alternative isocyanate is a crude form of MDI (diphenylmethane diisocyanate).

The present invention is operable with either polyether polyols or polyester polyols. Until recently, polyethers were more commonly used in rigid urethanes; however, polyesters are growing in use due to their lower cost.

Fluorocarbon blowing agents are used. One advantage of the present invention is that equivalent foam rise can be achieved with less fluorocarbon blowing agent. Further, rigid urethane foams made in accordance with the present invention show a significantly higher degree of fluorocarbon retention. This is important from the standpoint of preventing fluorocarbon emissions into the atmosphere.

Conventional rigid urethane catalysts are operable in the present invention. These include the well-known stannous and amino catalysts such as dibutyltin dilaurate, dibutyltin diacetate, stannous octoate, diazobicyclo[2.2.2]octane, N,N-dimethylethanolamine, N,N,N',N'-tetramethyl-1,3-butanediamine and etc. Cocatalyst systems of amines and dibutyltin salts are of course well-known and can be used in the present invention.

Optional additives such as flame retardants can also be incorporated into the rigid polyurethane.

EXPERIMENTAL DATA

Table I Experiments 1-32

In the series of experiments reported in Table I, an organic surfactant free of water or C-1 to C-3 alcohols, other than perhaps trace amounts, was mixed with one or more of the specific alternative siloxane-polyoxyalkylene surfactants described above and used in rigid polyurethane foam compositions which were comparable except that one included a minor amount of water and the other did not. Formula M, which contains the water, is as follows:

| Polyol | Isocyanate |
|---|---|
| 90 parts of Pluracol TM 364 (a sucrose based polyether polyol with a functionality of 6) 10 parts of Fryrol TM 6, a flame retardant 40 parts Freon TM 11, a blowing agent ½ part Polycat TM 8, an amine catalyst ½ part water | 131 parts polymeric MDI |

Formula O is basically the same as Formula M, except that no water is included. At one-half part, water comprises 0.3% of the rigid urethane polymer system of Formula M. The organic and silicone surfactant mixture was added to both Formula M and Formula O at a level of about 1.5% by weight in a ratio of 1:1 to each other. Thus, the proportions of water, organic and silicone surfactants in these experiments was approximately 16% water, 42% organic surfactant and 42% silicone surfactant.

In all of the experimental work, an approximate correlation was found between improvements in flow index, K factor, foam density and foam height. Since foam height was most easily measured, it was used as the indicator in evaluating the combinations tested.

Foam height was determined by pouring the thoroughly mixed urethane formulation into an opening in the top of the horizontal leg of an "L" shaped mold near the terminal end thereof. The developing foam flows the six inch length of the horizontal leg and then starts up the vertical leg which is about 30 inches tall. The height of the foam in the vertical leg, measured in sixteenths of an inch, is recorded below in Table I. The weight of urethane formulation poured was the same in all examples.

The first line of Table I is the control, in which only the silicone surfactants were employed. Thus, the extent of improvement, if any, as a result of adding the organic surfactant to the mixture is recorded. An asterisk is employed to indicate each instance in which foam height improved by five-sixteenths of an inch or more. An absence of data indicates that the combination was not tested. The code numbers in the surfactant column reference the surfactants identified above.

TABLE I

| Experiment No. | Organic Surfactant | Copolymer V | | Copolymer II | | Copolymer IV | | Copolymer III | | Copolymer I | |
|---|---|---|---|---|---|---|---|---|---|---|---|
| | | M | O | M | O | M | O | M | O | M | O |
| Control | (no organic surfactant employed) | 160 | 164 | 181 | 170 | 180 | 173 | 176 | 168 | 177 | 172 |
| 1. | S31 | 181* | 161 | 184 | 164 | 184 | 165 | | | | |
| 2. | S33 | 181* | 167 | | | 186* | 167 | 185* | 158 | | |
| 3. | S44 | 184* | 159 | 186* | 164 | 185* | 162 | | | 187* | 166 |
| 4. | S48 | | | 187* | | 187* | | | | | |
| 5. | S49 | | | | | 187* | 161 | 188* | 167 | | |

TABLE I-continued

| Experiment No. | Organic Surfactant | Copolymer V | | Copolymer II | | Copolymer IV | | Copolymer III | | Copolymer I | |
|---|---|---|---|---|---|---|---|---|---|---|---|
| | | M | O | M | O | M | O | M | O | M | O |
| 6. | S50 | | | 186* | 172 | 185* | 168 | 186* | 162 | | |
| 7. | S51 | | | 188* | 165 | 187* | 188* | | | | |
| 8. | S52 | 184* | 164 | 189* | 162 | 188* | 165 | 188* | 165 | | |
| 9. | S53 | 184* | 164 | 187* | 161 | 186* | 165 | | | | |
| 10. | S54 | 183* | 164 | 185 | 165 | 186* | 161 | | | | |
| 11. | S55 | 184* | 164 | 189* | 167 | 188* | 168 | 187* | 162 | | |
| 12. | S56 | 183* | 158 | 184 | 164 | 185* | 162 | | | | |
| 13. | S57 | | | 187* | 167 | 188* | 182* | | | | |
| 14. | S58 | | | 185 | 171 | 186* | 176 | | | | |
| 15. | S59 | 184* | 168 | 187* | 174 | 188* | 176 | 188* | 167 | | |
| 16. | S60 | 188* | 162 | | | | | | | | |
| 17. | S62 | 185* | 162 | 187* | 170 | 186* | 165 | 187* | 162 | | |
| 18. | S63 | | | 186* | 165 | 187* | 165 | | | | |
| 19. | S64 | | | 186* | 162 | 185* | 165 | | | | |
| 20. | S65 | 184* | 167 | 186* | 167 | 185* | 162 | 185* | 164 | 184* | 166 |
| 21. | S66 | 184* | 166 | 187* | 167 | 186* | 168 | 186* | 162 | 187* | 166 |
| 22. | S67 | 186* | 167 | | | 183 | 165 | 184* | 161 | 185* | 163 |
| 23. | S68 | | | | | 192* | 183* | 186* | 164 | | |
| 24. | S69 | | | 187* | 166 | 185* | 164 | | | | |
| 25. | S70 | 183* | 167 | 183 | 167 | 185* | 164 | 186* | 161 | 182* | 161 |
| 26. | S71 | | | 187* | 165 | | | 189* | 162 | | |
| 27. | S72 | 184* | 165 | 187* | 167 | 186* | 164 | 186* | 171 | | |
| 28. | S73 | 184* | 156 | | | 185* | 164 | | | 187* | 165 |
| 29. | S74 | 182 | | | | | | | | 184 | 165 |
| 30. | S75 | | | 184 | 167 | 186 | 164 | | | | |
| 31. | S76 | 183* | 170* | 187* | 171 | 186* | 167 | 186* | 161 | 186* | 165 |
| 32. | S77 | 186* | 165 | | | 183 | 165 | 184* | 161 | 185* | 163 |

As can be seen from the results of this Table, the organic surfactant and silicone surfactant combination generally improved the foam height of the rigid polyurethane foam by five-sixteenths of an inch or more in the case of Formula M which incorporated a minor amount of water. Foam height was always increased by this combination. With only a few exceptions, such significant improvement was not seen in the case of Formula O, which did not contain water. In fact in many cases, foam height was decreased by the incorporation of an organic surfactant with a silicone surfactant into the nonwater urethane formulation (Formula O).

Table II, Experiments 33-78

In the Table II experiments, commercial surfactants containing water were mixed with the indicated silicone surfactants in a 1:1 ratio. 1.5% by weight of these blends were then introduced into three different rigid polyurethane formulations, Formula M and Formula O as described above, and Formula R is as follows:

| Polyol | Isocyanate |
|---|---|
| 70 parts by weight Chardoyl 570 ™, a polyester polyol | 304 parts polymeric MDI |
| 30 parts by weight ethoxylated nonophenol solubilizer | |
| 63 parts fluorocarbon 11 blowing agent | |
| 7 parts Curithane 97 ™, an amine catalyst | |
| 1 part Polycat 43 ™, also an amine catalyst | |

As can be seen by the much higher quantity of polymeric MDI employed, Formula R is an isocyanurate formulation.

The results are reported in Table II below, with blanks indicating that not data was taken. The approximate percentage water and/or alcohol present in the surfactant itself is also indicated. As above, an improvement in foam height of five-sixteenth inch or more is indicated by an asterisk.

TABLE II

| Experiment No. | Organic | % H₂O in Organic | Copolymer V | | | Copolymer II | | | Copolymer IV | | | Copolymer III | | | Copolymer I | | |
|---|---|---|---|---|---|---|---|---|---|---|---|---|---|---|---|---|---|
| | | | M | O | R | M | O | R | M | O | R | M | O | R | M | O | R |
| Control | (no organic surfactant employed) | | 160 | 164 | 178 | 181 | 170 | 179 | 180 | 173 | 180 | 176 | 168 | 179 | 177 | 172 | 177 |
| 33 | S1 | 42% | | | | 188* | 176* | 181 | 188* | 170 | 175 | 189* | 168 | 181 | | | |
| 34 | S2 | 70% | | | | 191* | 179* | 186* | 194* | 177 | 184 | 192* | 180* | 186* | 191* | 162 | 174 |
| 35 | S3 | 41% | | | | 190* | 174 | 183 | 190* | 168 | 182 | | | | | | |
| 36 | S4 | 72% | | | | | | | 193* | 176 | 183 | | | | | | |
| 37 | S5 | 42% | | | | | | | 190* | 177 | 184 | | | | | | |
| 38 | S6 | 73% | | | | | | | 194* | 183* | 194* | | | | | | |
| 39 | S7 | 66% | | | | 192* | 177* | 185* | 193* | 182* | 192* | | | | | | |
| 40 | S8 | 26% | 183* | 168 | 182 | 186* | 171 | 184* | 187 | 173 | 184 | 186* | 167 | 179 | | | |
| 41 | S10 | 71% | | | | 192* | 180* | 183 | 194* | 164 | 179 | 191* | 179* | 184* | | | |
| 42 | S11 | 67% | | | | 191* | 180* | 183 | 193* | | | 192* | 174* | 184* | | | |
| 43 | S12 | 72% | | | | 192* | 174 | 183 | 194* | 176 | 185* | 191* | 177* | 184* | | | |
| 44 | S13 | 72% | | | | | | | 193* | 186* | 192* | 192* | 174* | 182 | 191* | 177* | 183* |
| 45 | S14 | 71% | | | | | | | 194* | 186* | 192* | | | | 189* | 176 | 182* |
| 46 | S15 | 72% | | | | | | | 193* | 179* | 183 | 191* | 180* | 182 | | | |
| 47 | S16 | 60% | | | | | | | 192* | 177 | 184 | | | | 190* | 174 | 181 |

TABLE II-continued

| Experiment No. | Organic | % H₂O in Organic | Copolymer V | | | Copolymer II | | | Copolymer IV | | | Copolymer III | | | Copolymer I | | |
|---|---|---|---|---|---|---|---|---|---|---|---|---|---|---|---|---|---|
| | | | M | O | R | M | O | R | M | O | R | M | O | R | M | O | R |
| 48 | S17 | 62% | | | | | | | 191* | 177 | 182 | | | | 188* | 179* | 186* |
| 49 | S18 | 72% | | | | | | | 194* | | | | | | 192* | 183 | 192 |
| 50 | S19 | 62% | | | | | | | 193* | 180* | 186* | | | | | | |
| 51 | S20 | 73% | | | | | | | 193* | 182* | 190* | | | | 192* | 180* | 187* |
| 52 | S21 | 67% | | | | | | | 194* | 183* | 193* | | | | | | |
| 53 | S22 | 41% | | | | | | | 191* | 171 | 181 | | | | | | |
| 54 | S23 | 63% | | | | | | | 190* | 176 | 183 | 188* | 174* | 184* | 187* | 180* | 183* |
| 55 | S24 | 60% | | | | 192* | 180* | 184* | 193* | 182* | 189* | 191* | 176* | 183 | | | |
| 56 | S25 | 70% | | | | 192* | 173 | 184* | 193* | 165 | 185* | 191* | 182* | 193* | | | |
| 57 | S26 | 70% | | | | 193* | 174 | 183 | 194* | 163 | 186* | 192* | 182* | 191* | 191* | 180* | 185* |
| 58 | S27 | 70% | | | | 192* | 175* | 188* | 194* | 188* | 195* | 193* | 182* | 192* | | | |
| 59 | S28 | 70% | 190* | 181* | 186* | | | | 195* | 186* | 192* | | | | 194* | 188* | 194* |
| 60 | S29 | 70% | | | | | | | 194* | 180* | 185* | | | | 192* | 186* | 192* |
| 61 | S30 | 70% | | | | | | | 194* | 182* | 192* | | | | | | |
| 62 | S32 | 12% | 186* | 168 | 182 | | | | 187* | 165 | 184 | 185* | 161 | 172 | | | |
| 63 | S34 | 40% | | | | 191* | 173 | 188* | 190* | 173 | 186* | | | | | | |
| 64 | S35 | 40% | | | | 191* | 176* | 184* | 190* | 173 | 185* | | | | | | |
| 65 | S36 | 61% | | | | | | | 192* | 183* | 194* | 191* | 177* | 186* | | | |
| 66 | S37 | 61% | | | | | | | 191* | 182* | 192* | | | | | | |
| 67 | S38 | 61% | 186* | 179* | 185* | | | | 192* | 180* | 184 | 191* | 176* | 183 | 191* | 180* | 184* |
| 68 | S39 | 61% | | | | | | | 193* | 183* | 193* | | | | | | |
| 69 | S40 | 65% | | | | | | | 193* | 183* | 192* | | | | | | |
| 70 | S41 | 62% | | | | | | | 192* | 191* | 193* | 191* | 184* | 193* | | | |
| 71 | S42 | 40% | | | | | | | 193* | 185* | 192* | | | | | | |
| 72 | S43 | 60% | | | | | | | 194* | 187* | 193* | | | | | | |
| 73 | S45 | 70% | 188* | 174* | 182 | | | | 191* | 182* | 192* | | | | | | |
| 74 | S46 | 70% | | | | 185 | 179* | 186* | 184 | 176 | 183 | 185* | 182* | 192* | | | |
| 75 | S47 | 70% | | | | | | | 194* | 188* | 194* | 193* | 179* | 185* | | | |
| 76 | S61 | 40% | | | | 190* | 180* | 191* | 171 | | | | | | | | |
| 77 | S78 | 75% | | | | 186* | 174 | 182 | | | | | | | | | |
| 78 | S79 | 75% | | | | 184* | 172 | 183 | 187* | | | 186* | 165 | 182 | 185* | 168 | 182* |

It can be seen that as a result of incorporating a small amount of water and/or C-1 to C-3 alcohol into the system, significantly improved foam heights were seen not only for Formula M, which contained 0.3% water, but also for Formula O which contained no water. Similarly, improved results were generally seen for the isocyanurate formula, Formula R.

The quantity of water and/or C-1 to C-3 alcohol in each system can be readily determined since the percentage of water and/or alcohol in the surfactant is indicated for each surfactant. The organic surfactant and diluent content in each case will be 50%, relative to the silicone surfactant.

It can be seen that where the water and/or alcohol content relative to the organic surfactant, silicone surfactant and water content fell below about 15%, improved results were generally not seen. In Experiment 40, utilizing a tridecyl polyoxyethylene sodium sulfate which was 74% active (S8), the water content of the surfactant system as a whole was only about 13%. The foam heights are generally improved (with one exception), but the improvement is not generally as dramatic as in the cases of higher water contents in the combination. Hence, this combination represents an approximate borderline for the system as regards low end water and/or alcohol content.

In Experiment 62 involving the use of an 88% active amine dodecylbenzene sulfonate, the water content of the surfactant system as a whole was only 6%. In the case of Formula O, some foam heights were lower than achieved with the "control" surfactant system. Of course in the case of Formula M, which itself included 0.3% water, which is approximately 16% relative to the total water, organic surfactant and silicone surfactant content of the system, improved results were always seen.

Table III, Experiments 79–86

In the experimental data reported in Table III, rigid urethane panels were poured in the "L" shaped mold as described above using five different silicone surfactants (Experiments 79-83), two surfactant combinations in accordance with the present invention (Experiments 84 and 85), and one organic surfactant and silicone surfactant combination employing no water (Experiment 86). In each case, panel weight, panel length, flow index, K factor (ASTM-C177) and density (ASTM-1622) were determined. Flow index is the height in sixteenths of an inch at the highest point of the vertical portion of a panel poured in the "L" shaped mold divided into the weight in grams of formulation poured. Formula R described above was the rigid polyurethane used.

TABLE III

COMPARATIVE SURFACTANT EVALUATION

| Exp. No. | Sample Descrip. | Panel Weight | Panel Length (in 16ths/inch) | Flow Index | K Factor | Density |
|---|---|---|---|---|---|---|
| 79. | Copolymer II | 180 gms | 259 | .695 | .110 | 2.62 |
| 80. | Copolymer IV | 183 gms | 256 | .715 | .112 | 2.50 |
| 81. | Copolymer V | 182 gms | 246 | .740 | .114 | 2.56 |
| 82. | Copolymer III | 182 gms | 248 | .734 | .111 | 2.59 |
| 83. | Copolymer I | 182 gms | 248 | .734 | .117 | 2.60 |
| 84. | 50% Copolymer IV & 50% dodecyl benzene | 180 gms | 289 | .623 | .113 | 2.17 |

TABLE III-continued
COMPARATIVE SURFACTANT EVALUATION

| Exp. No. | Sample Descrip. | Panel Weight | Panel Length (in 16ths/inch) | Flow Index | K Factor | Density |
|---|---|---|---|---|---|---|
| 85. | Sulfonate (40%) 25% Copolymer IV & 75% dodecyl benzene Sulfonate (40%) | 182 gms | 300 | .607 | .110 | 2.10 |
| 86. | 50% Copolymer III & 50% sorbitan monoleate | 182 gms | 250 | .726 | .112 | 2.54 |

It can be seen that generally satisfactory K factors were obtained with all of the silicone surfactants alone, except for Copolymer I which is normally used with flexible polyurethanes rather than rigid polyurethanes. Yet in the case of Experiments 84 and 85, made in accordance with the present invention, significantly improved densities, flow indexes and panel length were achieved without any corresponding loss in K factor. Densities of 2.10 and 2.17 pounds per cubic foot were achieved as compared with densities in excess of 2.5 pounds per cubic foot for the other surfactant combinations. The flow indexes achieved were also orders of magnitude lower than those achieved for the other surfactants, i.e., 0.623 and 0.607 as distinguished from about 0.7 or greater.

CONCLUSION

In conclusion, it can be seen that by using a surfactant system including water and/or C-1 to C-3 alcohol, organic surfactant and silicone surfactant, one can effect substantial improvement in the performance of rigid urethane foams. Foam height is increased, lower densities are obtained, system flow is improved and surprisingly, K factors are at least as good as K factors observed when silicone surfactants are used alone.

While there are limited exceptions to this conclusion, the substantial volume of experimental data reported herein clearly supports the foregoing premise. Of course, it is understood that the foregoing is merely a preferred embodiment of the invention and that various changes and alterations can be made without departing from the spirit and broader aspects thereof.

The embodiments of the invention in which an exclusive property or privilege is claimed are defined as follows:

1. A method for improving rigid urethane foams comprising:
incorporating into an unreacted rigid urethane polymer composition a minor amount of a non-siloxane organic surfactant, a minor amount of a siloxane-polyoxyalkylene surfactant and a minor amount of one ingredient of water, c-1 to C-3 alcohol and mixtures thereof.

2. The method of claim 1 wherein said siloxane-polyoxyalkylene surfactant is of the following general formula:

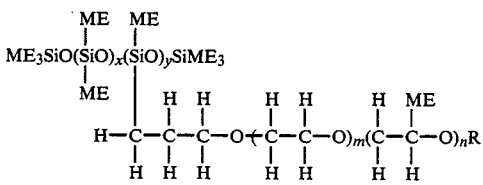

where: $x=1$ to 160, $y=1$ to 15, $m=0$ to 20, $n=0$ to 20, $m+N=$at least 1, if $n=5$-20 then $m=5$-20, and $R=$any terminal group which is compatible with surfactant activity.

3. The method of claim 2 wherein the total amount of said non-siloxane organic surfactant, said siloxane-polyoxyalkylene and said one ingredient is from about 1 to about 2% by weight of the total urethane foam system, and the proportions of said three ingredients relative to one another is such that each of the three ingredients comprises from about 15 to about 50% by weight of the aggregate.

4. The method of claim 3 wherein said non-siloxane organic surfactant and said siloxane-polyoxyalkylene surfactant are selected so as to be cosoluble with one another and with said one ingredient, said three ingredients being premixed with one another prior to introduction into said urethane formulation.

5. The method of claim 4 wherein said siloxane-polyoxyalkylene surfactant is selected from the group consisting of siloxane-polyoxyalkylene surfactants having the following formula values:
  1. $x=103$, $y=9.5$, $m=18$, $n=18$ and $R=$an acetoxy group;
  2. $x=8.6$, $y=3.6$, $m=12$, $n=0$ and $R=$hydroxyl group;
  3. $x=8.6$, $y=3.6$, $M=12$, $n=0$ and $R=$an acetoxy group;
  4. $x=8.6$, $y=3.6$, $m=7$, $n=0$ and $R=$a hydroxyl group;
  5. $x=1$, $y=1$, $m=0$, $n=2$ and $R=$a methoxy group;
and mixtures of the foregoing siloxane-polyoxyalkylene surfactants.

6. The method of claim 5 wherein said siloxane-polyoxyalkylene has the following formula values: $x=8.6$, $y=3.6$, $m=7$, $n=0$ and $R=$a hydroxyl group.

7. The method of claim 3 in which the terminal group represented by the letter "R" in the general formula set forth in claim 2 comprises a nonisocyanate reactive group, and where said siloxane-polyoxyalkylene surfactant is incorporated into the isocyanate component of the rigid urethane foam system.

8. The method of claim 3 in which said non-siloxane organic surfactant is a nonionic surfactant and is incorporated into the isocyanate component of said rigid urethane formulation.

9. The method of claim 2 in which the terminal group represented by the letter "R" in the general formula set forth in claim 2 comprises a nonisocyanate reactive group, and where said siloxane-polyoxyalkylene surfactant is incorporated into the isocyanate component of the rigid urethane foam system.

10. The method of claim 2 in which said non-siloxane organic surfactant is a nonionic surfactant and is incorporated into the isocyanate component of said rigid urethane formulation.

11. The method of claim 2 in which said one ingredient is water.

12. The method of claim 1 in which said one ingredient is water.

The method of claim 1 wherein the total amount of said organic surfactant, siloxane-polyoxyalkylene and third component ingredients is from about 1 to about 2% by weight of the total urethane foam system, and the proportions of 13. The method of claim 1 wherein the total amount of said non-siloxane organic surfactant, said siloxane-polyoxyalkylene and said one ingredient is from about 1 to about 2% by weight of the total urethane foam system, and the proportions of said three ingredients relative to one another is such that each of the three ingredients comprised from about 15 to about 50% by weight of the aggregate.

14. A surfactant combination for use in the manufacture of rigid urethane foams comprising from about 15 to about 50% of a non-siloxane orqanic surfactant; from about 15 to about 50% of a siloxane-polyoxyalkylene surfactant; and from about 15 to about 50% of one of water, C-1 to C-3 alcohol and mixtures thereof.

15. The surfactant combination of claim 14 in which said siloxane-polyoxyalkylene surfactant is of the following general formula:

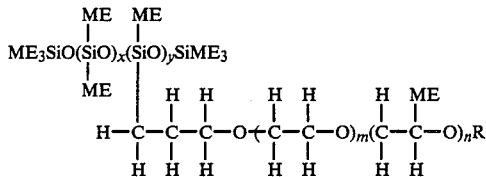

where: $x=1-160$, $y=1-15$, $m=0-20$, $n=0-20$, $m+n=$at least 1, if $n=5-20$ then $m=5-20$, and $R=$any terminal group which is compatible with surfactant activity.

16. The surfactant combination of claim 15 wherein said non-siloxane organic surfactant and said siloxane-polyoxyalkylene surfactant are selected so as to be cosoluble with one another and with said one ingredient, said three ingredients being premixed with one another prior to introduction into said urethane formulation.

17. The surfactant combination of claim 16 wherein said siloxane-polyoxyalkylene surfactant is selected from the group consisting of siloxane-polyoxyalkylene surfactants having the following formula values:
1. $x=103$, $y=9.5$, $m=18$, $n=18$ and $R=$an acetoxy group;
2. $x=8.6$, $y=3.6$, $m=12$, $n=0$ and $R=$a hydroxyl group;
3. $x=8.6$, $y=3.6$, $m=12$, $n=0$ and $R=$an acetoxy group;
4. $x=8.6$, $y=3.6$, $m=7$, $n=0$ and $R=$a hydroxyl group;
5. $x=1$, $y=1$, $m=0$, $n=2$ and $R=$a methoxy group; and mixtures of the foregoing siloxane-polyoxyalkylene surfactants.

18. The surfactant combination of claim 16 wherein said siloxane-polyoxyalkylene has the following formula values:
$x=8.6$, $y=3.6$, $m=7$, $n=0$ and $R=$a hydroxyl group.

19. The surfactant combination of claim 15 wherein said siloxane-polyoxyalkylene surfactant is selected from the group consisting of siloxane-polyoxyalkylene surfactants having the following formula values:
1. $x=103$, $y=9.5$, $m=18$, $n=18$ and $R=$an acetoxy group;
2. $x=8.6$, $y=3.6$, $m=12$, $n=0$ and $R=$a hydroxyl group;
3. $x=8.6$, $y=3.6$, $m=12$, $n=0$ and $R=$an acetoxy group;
4. $x=8.6$, $y=3.6$, $m=7$, $n=0$ and $R=$a hydroxyl group;
5. $x=1$, $y=1$, $m=0$, $n=2$ and $R=$a methoxy group; and mixtures of the foregoing siloxane-polyoxyalkylene surfactants.

20. The surfactant combination of claim 15 wherein said siloxane-polyoxyalkylene has the following formula values:
$x=8.6$, $y=3.6$, $m=7$, $n=0$ and $R=$a hydroxyl group.

21. The surfactant combination of claim 15 in which said one ingredient is water.

22. The surfactant combination of claim 14 in which said one ingredient is water.

23. A rigid polyurethane foam formulation comprising:
a rigid foam forming polyol;
an isocyanate;
a blowing agent;
a minor amount of a non-siloxane organic surfactant;
a minor amount of a siloxane-polyoxyalkylene surfactant and a minor amount of one of water, a C-1 to C-3 alcohol and mixtures thereof.

24. The rigid polyurethane foam formulation of claim 23 in which said siloxane-polyoxyalkylene surfactant is of the general formula:

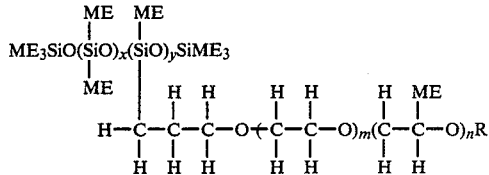

where: $x=1-160$, $y=1-15$, $m=0-20$, $n=0-20$, $m+n=$at least 1, if $n=5-20$ then $m=5-20$, and $R=$any terminal group which is compatible with surfactant activity.

25. The rigid polyurethane foam formulation of claim 24 wherein the total amount of aid non-siloxane organic surfactant, said siloxane-polyoxyalkylene and said one ingredient is from about 1 to about 2% by weight of the total urethane foam system, and the proportions of said three ingredients relative to one another is such that each of the three ingredients comprises from about 15 to about 50% by weight of the aggregate.

26. The rigid polyurethane of claim 25 wherein said siloxane-polyoxyalkylene surfactant is selected from the group consisting of siloxane-polyoxyalkylene surfactants having the following formula values:
1. $x=103$, $y=9.5$, $m=18$, $n=18$ and $R=$an acetoxy group;
2. $x=8.6$, $y=3.6$, $m=12$, $n=0$ $R=$hydroxyl group;
3. $x=8.6$, $y=3.6$, $m=12$, $n=0$ and $R=$an acetoxy group;

4. $x=8.6$, $y=3.6$, $m=7$, $n=0$ and $R=$ a hydroxyl group;

5. $x=1$, $y=1$, $m=0$, $n=2$ and $R=$ a methoxy group;

and mixtures of the foregoing siloxane-polyoxyalkylene surfactants.

27. The rigid polyurethane of claim 25 wherein said siloxane-polyoxyalkylene has the following formula values:

$x=8.6$, $y=3.6$, $m=7$, $n=0$ and $R=$ a hydroxyl group.

28. The rigid polyurethane of claim 24 wherein said siloxane-polyoxyalkylene surfactant is selected from the group consisting of siloxane-polyoxyalkylene surfactants having the following formula values:

1. $x=103$, $y=9.5$, $m=18$, $n=18$ and $R=$ an acetoxy group;

2. $x=8.6$, $y=3.6$, $m=12$, $n=0$ and $R=$ hydroxyl group;

3. $x=8.6$, $y=3.6$, $m=12$, $n=0$ and $R=$ an acetoxy group;

4. $x=8.6$, $y=3.6$, $m=7$, $n=0$ and $R=$ a hydroxyl group;

5. $x=1$, $y=1$, $m=0$, $n=2$ and $R=$ a methoxy group; and mixtures of the foregoing siloxane-polyoxyalkylene surfactants.

29. The rigid polyurethane of claim 24 wherein said siloxane-polyoxyalkylene has the following formula values:

$x=8.6$, $y=3.6$, $m=7$, $n=0$ and $R=$ a hydroxyl group.

30. The rigid polyurethane of claim 24 in which said one ingredient is water.

31. The rigid polyurethane of claim 23 in which said one ingredient is water.

32. The rigid polyurethane of claim 23 wherein the total amount of said non-siloxane organic surfactant, said siloxane-polyoxyalkene and said one ingredient is from about 1 to about 2% by weight of the total urethane foam system, and the proportions of said three ingredients relative to one another is such that each of the three ingredients comprises from about 15 to about 50% by weight of the aggregate.

* * * * *

UNITED STATES PATENT AND TRADEMARK OFFICE
CERTIFICATE OF CORRECTION

PATENT NO. : 4,751,251
DATED : June 14, 1988
INVENTOR(S) : James D. Thornsberry

It is certified that error appears in the above-identified patent and that said Letters Patent is hereby corrected as shown below:

Column 8, line 18:

Delete "Fryrol" and insert --Fyrol--.

Column 10, line 45:

Delete "not" and insert --no--.

Column 13, line 55:

Delete "c-1" and insert --C-1--.

Column 15, line 7:

Delete "The method of claim 1 wherein the total amount of said organic surfactant, siloxane-polyoxyalkylene and third component ingredients is from about 1 to about 2% by weight of the total urethane foam system, and the proportions of".

Column 15, line 18:

Delete "comprised" and insert --comprises--.

Column 15, line 22:

Delete "orqanic" and insert --organic--.

UNITED STATES PATENT AND TRADEMARK OFFICE
CERTIFICATE OF CORRECTION

PATENT NO. : 4,751,251

DATED : June 14, 1988

INVENTOR(S) : James D. Thornsberry

It is certified that error appears in the above-identified patent and that said Letters Patent is hereby corrected as shown below:

Column 16, line 53:

Delete "aid" and insert --said--.

Signed and Sealed this

Twenty-seventh Day of December, 1988

*Attest:*

DONALD J. QUIGG

*Attesting Officer*   *Commissioner of Patents and Trademarks*